Patented Nov. 2, 1943

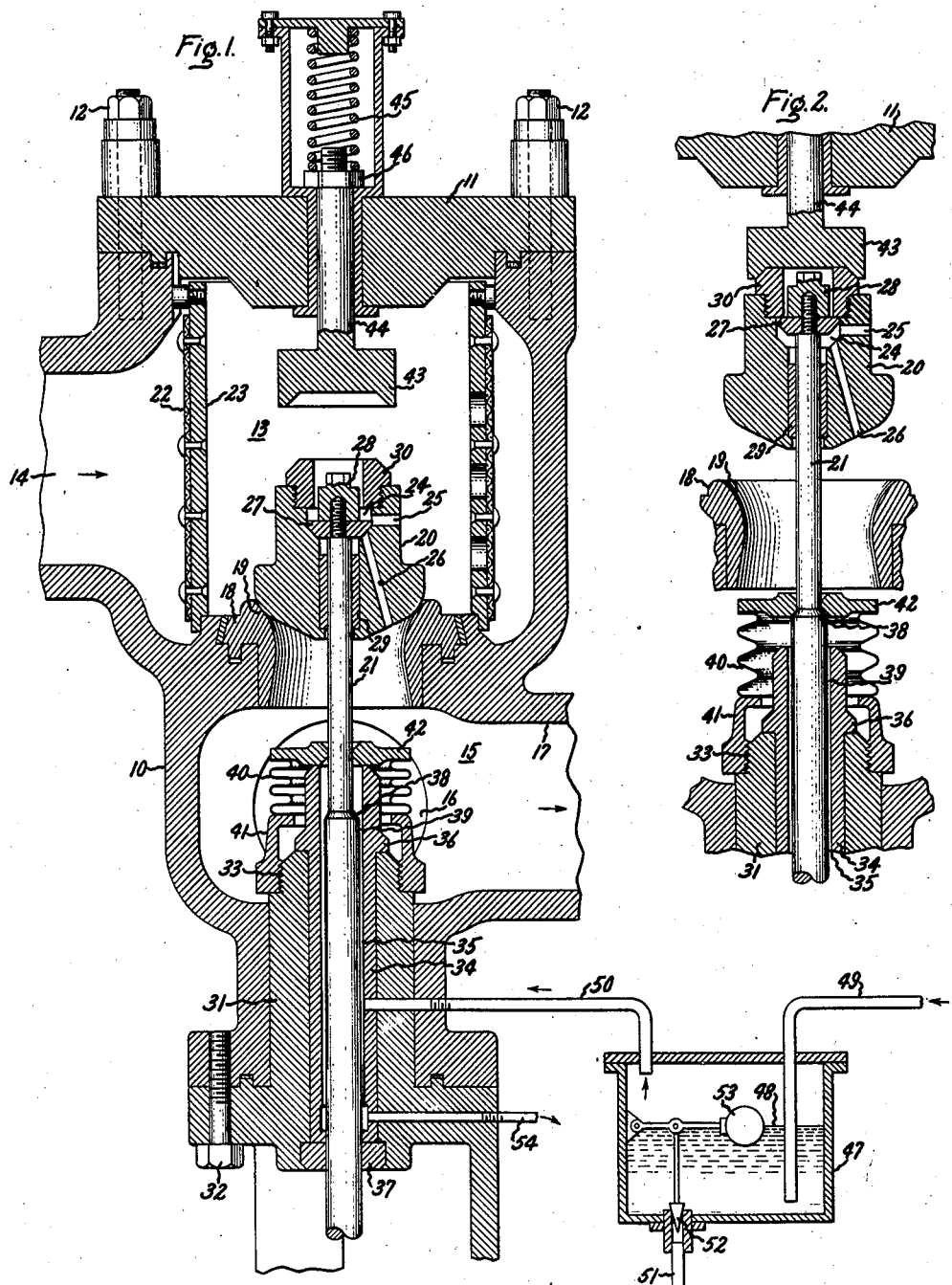

2,333,455

UNITED STATES PATENT OFFICE 2,333,455

VALVE ARRANGEMENT

Glenn B. Warren, Niskayuna, N. Y., assignor to General Electric Company, a corporation of New York Application April 4, 1942, Serial No. 437,683

10 Claims. (Cl. 251—31)

The present invention relates to valve arrangements in which a movable valve member disposed within a casing and cooperatively associated with a seat on the casing is moved by means of a valve stem slidably projecting through a bore in the casing. Difficulties have heretofore been experienced with such arrangements due to the valve stem becoming sticky as may be caused by solid matter carried from a steam boiler into the valve. The situation is particularly serious in connection with stop valves which are operated infrequently. Thus, disastrous consequences may occur if during emergency the stop valve of a turbo generator cannot be readily closed and the load is thrown off the generator.

The object of my invention is to provide an improved construction and arrangement of valves whereby the access of solid matter into the bore or bushing of a valve casing is substantially reduced and the danger of sticking of the valve stem in the bore or bushing thereby eliminated.

For a consideration of what I believe to be novel and my invention, attention is directed to the following description and the claims appended thereto in connection with the accompanying drawing.

In the drawing Fig. 1 illustrates a sectional view of a valve arrangement in closed position embodying my invention, and Fig. 2 shows certain parts of Fig. 1 in fully open position.

The arrangement comprises a casing 10 with a cover 11 secured to the casing by bolts 12. The casing forms an inlet chamber 13 with an inlet 14 and an outlet chamber 15 with outlets 16, 17. A ring 18 forming a valve seat 19 is secured to the casing between the inlet chamber 13 and the outlet chamber 15. The flow of fluid from the chamber 13 to the chamber 15 is controlled by a movable valve member 20 supported on a valve stem 21. A cylindrical screen 22 secured to a cylindrical perforated backing 23 is disposed within and secured to the walls of the chamber 13 to prevent access of large pieces of solid matter into the outlet chamber 15.

The movable valve member 20 has a central bore 24 communicating through a port 25 with the chamber 13 and through another port or passage 26 with the outlet chamber 15. The flow of fluid from the chamber 13 through the passages 25, 26 into the chamber 15 is controlled by a pilot valve 27 disposed within the bore 24 of the valve member 20. The pilot valve 27 is secured to a threaded end portion of the stem 21 by means of a nut 28. The stem 21 projects through a bushing 29 securely held in a bore of the valve member 20. Upward movement of the pilot valve member 27 is limited by a stop in the form of a plug 30 screwed into the upper end of the valve member 20 and constituting an element for connecting the stem 21 to the valve member 20. Upon upward movement of the stem 21 at first the pilot valve 27 opens and establishes communication between the ports 25 and 26 through the chamber 24. Upon movement of the stem 21 the valve member 27 engages the lower face of the plug 30 and thereby carries the valve member 20 upward in opening direction. In turbine arrangements in which stop valves of this kind may be used it is customary to permit opening of the main valve 20 only after the pressure drop between the inlet chamber 13 and the outlet chamber 15 has been considerably reduced.

A flanged outer bushing 31 is inserted into an opening of the chamber 16 and secured by bolts 32 to the casing 10. This bushing has an upper threaded end portion 33. An inner bushing 34 with a bore 35 projects into the bushing 31. An upper portion of the inner bushing 34 disposed within the outlet chamber 15 has an annular projection 36 engaging the upper end face of the outer bushing 31. A packing ring 37 is inserted into and securely held in the lower end of the outer bushing 31. The valve stem 21 has a lower portion with a larger diameter than that of the upper portion and forming a conical shoulder 38. This lower portion of the stem projects through the bore 35 of the inner bushing 34. The clearance 39 between the bore 35 and the valve stem has been somewhat exaggerated in the drawing but is preferably larger than is customary in ordinary valve arrangements.

In order to prevent access of solid matter into the clearance 39 I provide in accordance with my invention a bellows 40 which concentrically surrounds a portion of the valve stem 21 within the chamber 15. The lower end of the bellows is fused to a ring 41 screwed onto the threaded portion 33 of the outer bushing 31. The upper end of the bellows is sealed and securely fastened to a ring 42 surrounding the upper portion of the valve stem 21 and having close sliding fit therewith. In a preferred embodiment the inner portion of the ring 42 is V-shaped in section or knife edge shaped in order to prevent sticking of the ring 42 on the shaft 21, one side at least of the knife edge portion being ground to form a smooth seat for the shoulder 38 on the stem 21. In closed position the ring 42 engages the upper end of the inner bushing 34. The conical shoulder 38 of the valve stem 21 in closed position is spaced from the ring 42. During operation upon a certain opening movement the conical shoulder 38 engages the ring 42, forcing the same upward, thereby expanding the bellows 40 as shown in Fig. 2. Due to the loose sealing contact between the stem and the ring 42 and due to the spacing between the conical shoulder 38 of the valve stem and the ring 42 on the bellows in closed position, it is possible to provide for a certain valve stroke a much shorter bellows and therefore a more compact construction than would be possible if the upper end of the bellows were fused to the stem 21.

Upward movement of the valve member 20 is limited by a yieldable stop 43 which has a stem 44 projecting through the end plate 11 and biased downward by a compression spring 45 engaging a nut 46 screwed to an upper end portion of the stem 44. The stop 43 limits upward movement of the valve and also reduces vibration of the valve member when in fully open position.

The flow of solid matter into the valve stem clearance 35 in the present arrangement is further prevented by the provision of means for establishing a counterflow in said clearance or for setting up therein a pressure equal to or slightly higher than the pressure in the chamber 15. In the present example, in which the valve is intended for use in connection with a steam turbine, means are provided for conducting saturated steam to the clearance 35. This means comprises a tank or reservoir 47 for containing water 48. Superheated steam is conducted to the reservoir 47 by a conduit 49 which has an outlet located below the level of the water 48 whereby the superheated steam is desuperheated and solid matter contained in the steam is retained in the body of water 48. Saturated steam is discharged from the tank 47 through a conduit 50 and conducted to an intermediate point of the clearance 35. The tank 47 has an outlet or drain pipe 51 and the discharge of water from the tank may be automatically controlled by means including a valve 52 actuated by a float 53. Steam and water may be discharged from the lower end of the clearance 35 through a drain passage 54.

Thus, with my invention I have provided an improved construction and arrangement of valves whereby the tendency of the valve stem to become sticky in the bore or bushing through which it projects is substantially eliminated by the provision of a bellows fastened at one end to the casing or bushing and loosely sealed at the other end to the valve stem; the loose sealing arrangement has a close sealing fit with the stem without being fused thereto, thus permitting relative movement between the stem and the sealing means. Though not essential, it may be desirable in some instances to combine the bellows arrangement with a fluid sealing means for conducting gas or saturated steam to the clearance space between the valve stem and the bushing or bore.

Having described the method of operation of my invention, together with the apparatus which I now consider to represent the best embodiment thereof, I desire to have it understood that the apparatus shown is only illustrative and that the invention may be carried out by other means.

What I claim as new and desired to secure by Letters Patent of the United States is:

1. Valve arrangement comprising a casing having a bore and forming two chambers and a valve seat between the chambers, a movable valve member cooperatively associated with the seat, a stem connected to the valve member and loosely projecting through the bore, and means to reduce access of solid matter from the chambers into the clearance formed between the bore and the stem without restraining movement of the stem, said means comprising a bellows concentrically surrounding a portion of the stem in one of the chambers, means securing one end of the bellows to the casing and a disk with a central bore secured to the other end of the bellows and loosely engaging the stem to define a sliding fit therewith permitting movement of the stem without affecting the bellows.

2. Valve arrangement comprising a casing having a bore and forming two chambers and a valve seat between the chambers, a movable valve member cooperatively associated with the seat, a stem connected to the valve member and loosely projecting through the bore, and means to reduce access of solid matter from the chambers into the clearance between the bore and the stem without affecting movement of the stem, said means comprising a bellows concentrically surrounding a portion of the stem in one of the chambers and having one end secured to the casing and a ring secured to the other end of the bellows and having an inner edge reduced in thickness and forming a close clearance with the stem and permitting movement of the stem without affecting the bellows.

3. Valve arrangement comprising a casing having a bore and forming two chambers and a valve seat between them, a movable valve member cooperatively associated with the seat, a stem connected to the valve member and projecting through the bore, and means loosely sealing the stem to the inner end of the bore to reduce access of solid matter from the chambers into the clearance between the bore and the stem without affecting movement of the stem, said means comprising a bellows concentrically surrounding a portion of the stem in one of the chambers, means securing one end of the bellows to the casing and a ring sealed to the other end of the bellows and having an inner knife edge shaped portion in loose sealing contact with the stem and permitting movement of the stem without affecting the bellows.

4. A valve arrangement comprising a casing having a bore and forming two chambers and a valve seat between them, a movable valve member cooperatively associated with the seat, a stem connected to the valve member and loosely projecting through the bore, and means to reduce access of solid matter from the chambers into the clearance between the bore and the stem without affecting movement of the latter, said means comprising a bellows concentrically surrounding a portion of the stem in one of the chambers, means securing one end of the bellows to the casing, other means secured to the other end of the bellows and forming a close clearance with the stem and permitting movement of the stem without affecting the bellows and an annular projection secured to the casing and concentrically surrounding the stem within the bellows to prevent the latter from collapsing.

5. Valve arrangement comprising a casing having a bore and forming two chambers and a valve seat between them, a movable valve member cooperatively associated with the seat, a stem connected to the valve member and loosely projecting through the bore, and means to reduce access of solid matter from the chambers into the clearance between the bore and the stem, said means comprising a bellows concentrically surrounding a portion of the stem in one of the chambers, means securing one end of the bellows to the casing and a ring secured to the other end of the bellows and having loose sealing contact with the stem, the stem having a shoulder within the bellows and spaced from the ring in closed position of the valve and engaging the ring upon partial opening of the valve.

6. Valve arrangement comprising a casing having a bore and forming a chamber and a valve seat, a bushing projecting through the bore into the chamber, a movable valve member cooperatively associated with the seat, a stem connected to the valve member and loosely projecting through the bushing, and means to reduce access of solid matter from the chamber into the clearance formed between the bushing and the stem without affecting the movement of the stem, said means comprising a bellows concentrically surrounding the projection of the bushing, means sealing one end of the bellows to the bushing, a ring secured to the other end of the bellows and having an inner edge in loose sealing engagement with the stem, and means on the stem within the bushing for engaging the ring upon partial opening of the valve.

7. Valve arrangement comprising a casing having a bore and forming two chambers and a valve seat between them, a bushing projecting through the bore into one of the chambers, a movable valve member cooperatively associated with the seat, a stem connected to the valve member and loosely projecting through the bushing, and means loosely sealing the stem to the casing near the inner end of the bushing, said means comprising a bellows concentrically surrounding the projection of the bushing, means sealing one end of the bellows to the bushing and a ring secured to the other end of the bellows and having an inner knife edge shaped portion in loose sealing engagement with the stem, the stem having a conical shoulder spaced from the ring in closed position of the valve and engaging the ring upon partial opening of the valve.

8. Valve arrangement comprising a casing having a bore and forming two chambers and a valve seat between them, a bushing projecting through the bore into one of the chambers, a movable valve member cooperatively associated with the seat, a stem connected to the valve member and loosely projecting through the bushing, and means to reduce access of solid matter from the chambers into the bushing, said means comprising a bellows concentrically surrounding the projection of the bushing, means sealing one end of the bellows to the bushing, a ring secured to the other end of the bellows and having an inner knife edge shaped portion in loose sealing engagement with the stem, the stem having a conical shoulder spaced from the ring in closed position of the valve and engaging the ring upon partial opening of the valve, and a yieldable stop supported on the casing for engaging the valve member in open position to reduce vibration due to fluid flow through the chambers.

9. Valve arrangement comprising a casing having a bore and forming two chambers and a valve seat between them, a bushing projecting through the bore into one of the chambers, a movable valve member cooperatively associated with the seat, a stem connected to the valve member and projecting through the bushing, and means to reduce access of solid matter from the chambers into the bushing, said means comprising a bellows concentrically surrounding the projection of the bushing, means sealing one end of the bellows to the bushing, a ring secured to the other end of the bellows and having an inner knife edge shaped portion in loose sealing engagement with the stem, the stem having a conical shoulder spaced from said ring in closed position of the valve and engaging the ring upon opening of the valve, a yieldable stop supported on the casing for engaging the valve member in open position to reduce vibration due to fluid flow through the chambers, and means connected to the bushing to circulate fluid under pressure through the annular clearance between the bushing and the stem.

10. Valve arrangement comprising a casing having a bore and forming two chambers with a valve seat between them, a movable valve member cooperatively associated with the seat, a stem connected to the valve member and projecting through the bore, means to reduce access of solid matter from the chambers into the clearance between the bore and the stem, said means comprising a member securely sealed to the casing and forming a seat surrounding the stem, said stem having a shoulder for engaging the seat in the open position only of the valve, and a flexible stop for engaging the valve in its open position.

GLENN B. WARREN.